United States Patent
Zhang et al.

(10) Patent No.: US 8,212,789 B2
(45) Date of Patent: Jul. 3, 2012

(54) PORTABLE ELECTRONIC APPARATUS WHOSE KEYBOARD AND DISPLAY ARE SWITCHABLE

(75) Inventors: Dang-Ku Zhang, Shenzhen (CN); Huo-Ming Shuai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 370 days.

(21) Appl. No.: 12/512,040

(22) Filed: Jul. 30, 2009

(65) Prior Publication Data

US 2010/0309143 A1    Dec. 9, 2010

(30) Foreign Application Priority Data

Jun. 9, 2009  (CN) .......................... 2009 1 0303092

(51) Int. Cl.
*G06F 3/041*    (2006.01)
(52) U.S. Cl. ................... 345/173; 345/169; 361/679.01; 455/466

(58) Field of Classification Search ............ 345/1.1–1.3, 345/169, 173, 168; 361/600, 679.01, 679.02, 361/679.08, 679.09, 679.17, 679.21, 679.26, 361/679.55; 455/466, 575.4
See application file for complete search history.

(56) References Cited

U.S. PATENT DOCUMENTS

| | | | |
|---|---|---|---|
| 2003/0006942 A1* | 1/2003 | Searls et al. ................... 345/1.1 |
| 2010/0066640 A1* | 3/2010 | Wakefield ...................... 345/1.1 |

* cited by examiner

*Primary Examiner* — Kimnhung Nguyen
(74) *Attorney, Agent, or Firm* — Altis Law Group, Inc.

(57) ABSTRACT

A portable electronic apparatus whose keyboard and display are switchable is provided. The apparatus comprises a main part and a detachable part that can be assembled to the main part. The main part includes a first display, a keyboard interface, and a display interface. One face of the detachable part is a keyboard, and an opposite face of the detachable part is a second display. The detachable part includes a display plug and a keyboard plug. When the keyboard plug of the detachable part is plugged into the keyboard interface of the main part the keyboard is enable to use. When the display plug of the detachable part is plugged into the display interface of the main part, the second display is enabled to use.

9 Claims, 4 Drawing Sheets

PORTABLE ELECTRONIC APPARATUS WHOSE KEYBOARD AND DISPLAY ARE SWITCHABLE

BACKGROUND

1. Technical Field

The present disclosure relates to an electronic apparatus whose keyboard and display are switchable.

2. Description of Related Art

With the development of the portable electronic apparatuses, together with the application of 3G telecommunication technology, the functions of the portable electronic apparatus are more powerful, such as watching TV, surfing the Internet, or watching films. Due to the small size of the portable electronic apparatuses and the existence of a keyboard, the size of the display of the portable electronic apparatuses is relatively small, which limits the entertainment value of using the portable electronic apparatuses when watching TV and video or surfing the Internet. Although some portable electronic apparatuses use touch screens and have no keyboard, people may miss the keyboard.

BRIEF DESCRIPTION OF THE DRAWINGS

The components of the drawings are not necessarily drawn to scale, the emphasis instead being placed upon clearly illustrating the principles of the electronic apparatus. Moreover, in the drawings, like reference numerals designate corresponding parts throughout several views.

DETAILED DESCRIPTION

Figure 1:
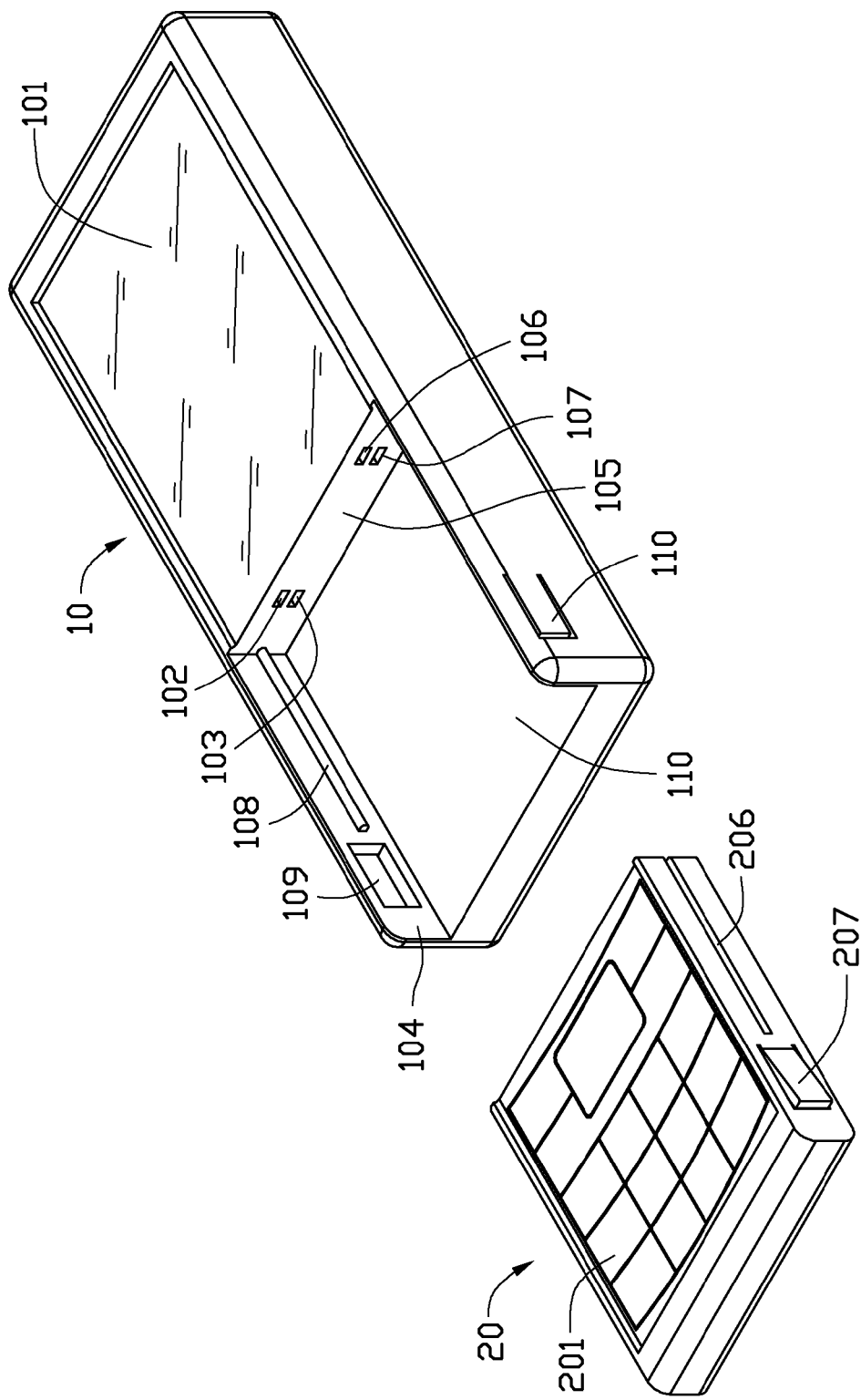
FIG. 1 is a schematic, isometric diagram of a portable electronic apparatus whose keyboard and display are switchable, in accordance with an exemplary embodiment.

FIG. 1 is a schematic, isometric diagram of a portable electronic apparatus whose keyboard and display are switchable (hereafter "the apparatus") in accordance with an exemplary embodiment. The apparatus includes a main part 10 and a detachable part 20 that can be assembled to the main part 10.

Figure 2:
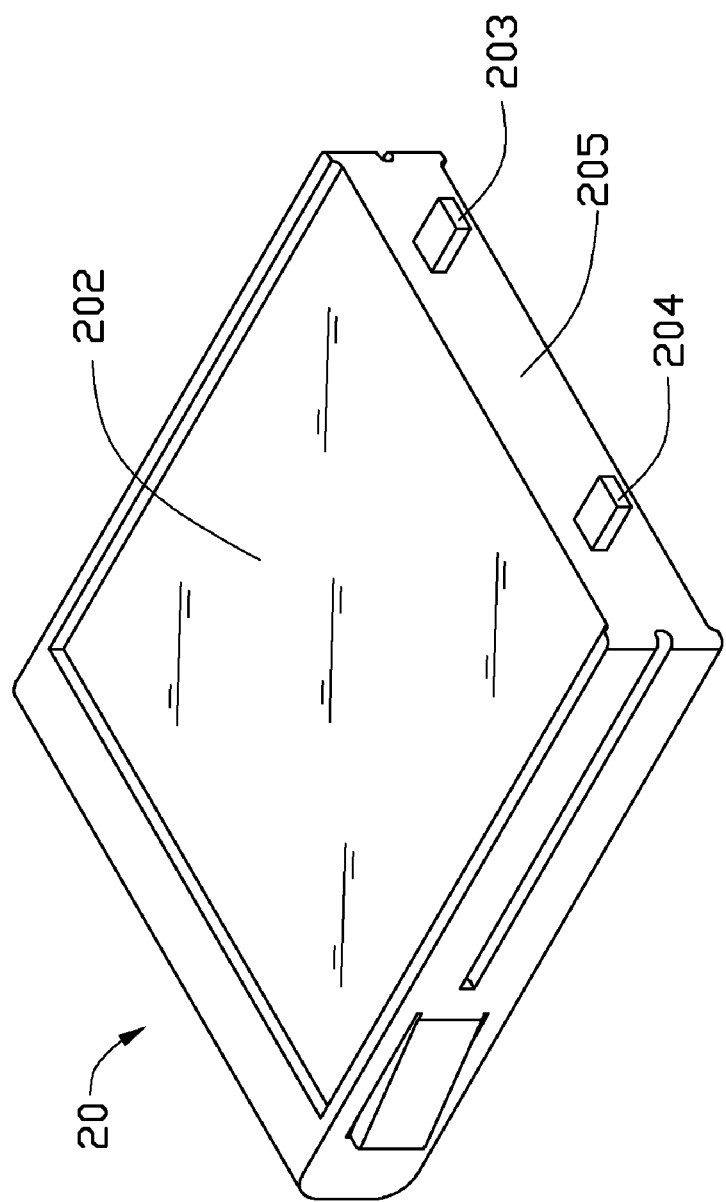
FIG. 2 is schematic, isometric diagram of a detachable part of the portable electronic apparatus of FIG. 1.

The main part 10 includes a first display 101, a keyboard interface 102, a display interface 103, and a frame 104 for receiving the detachable part 20. One face of the detachable part 20 is a keyboard 201, and an opposite face of the detachable part 20 is a second display 202, as shown in FIG. 2. The detachable part 20 further includes a display plug 203 and a keyboard plug 204.

Figure 3:
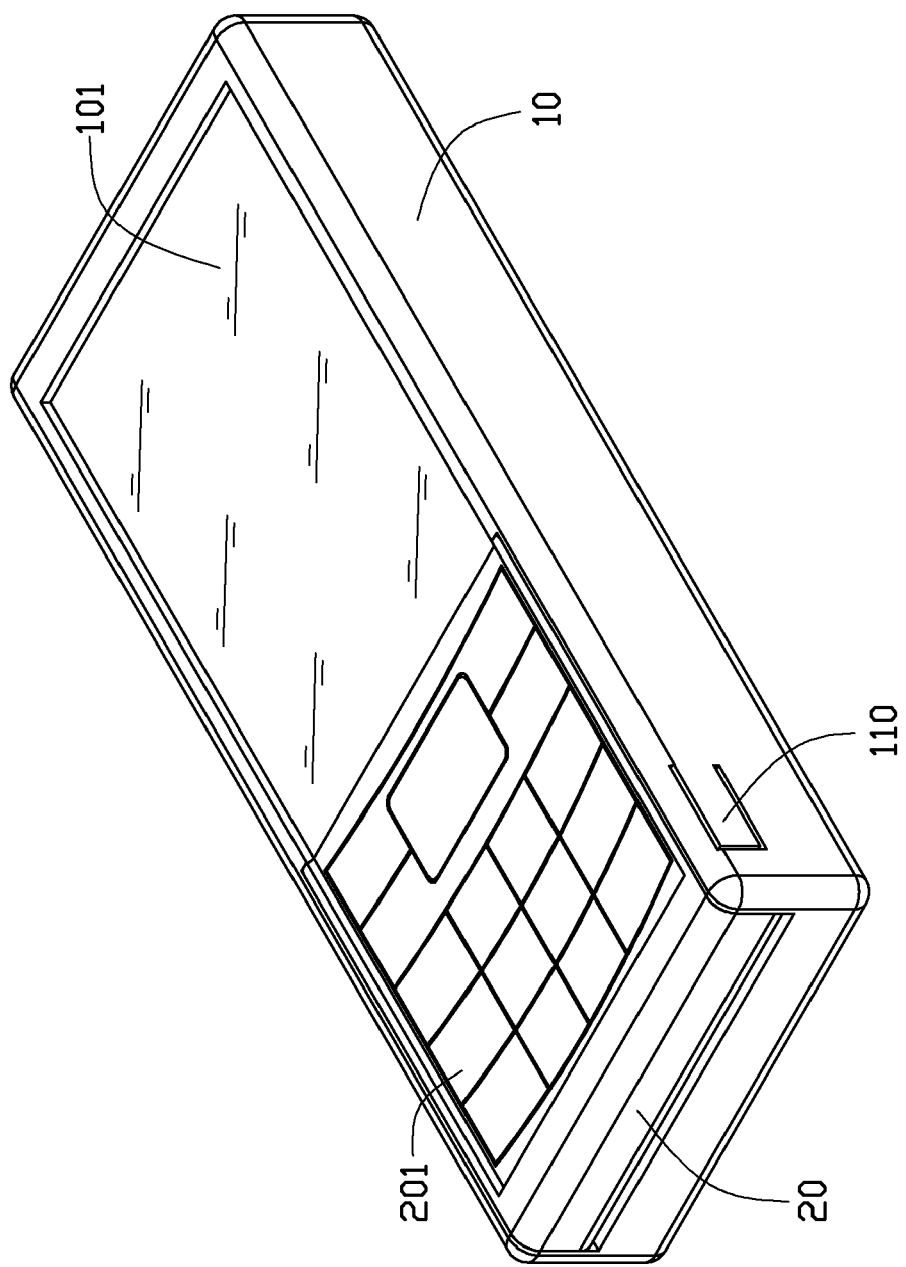
FIG. 3 is schematic, isometric diagram of the portable electronic apparatus when a keyboard of the detachable part is used.
Figure 4:
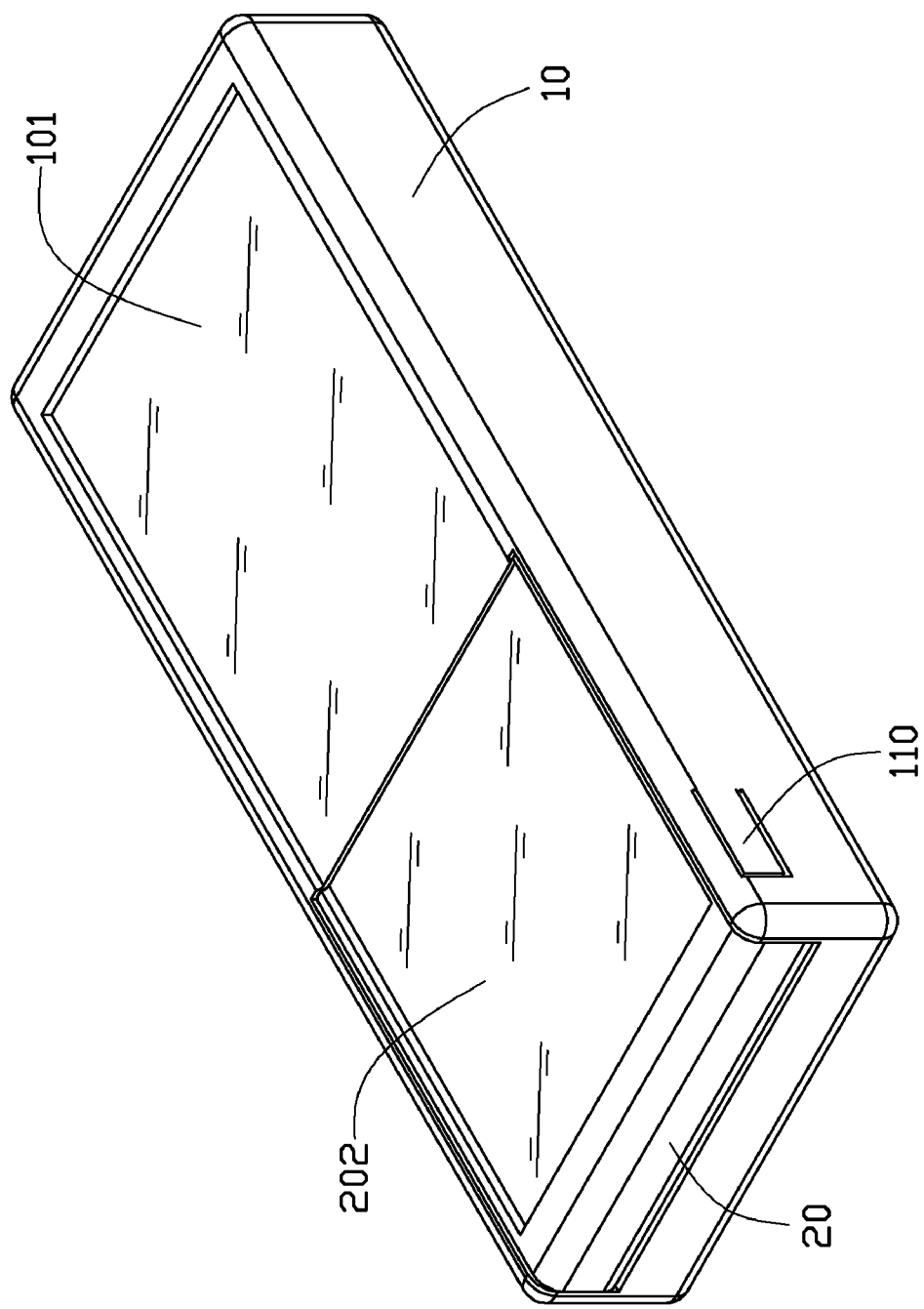
FIG. 4 is schematic, isometric diagram of the portable electronic apparatus when a second display of the detachable part is used.

When the keyboard 201 is used, the keyboard plug 204 of the detachable part 20 is plugged into the keyboard interface 102 of the main part 10 to assemble the detachable part 20 to the main part 10, as shown in FIG. 3. When the second display 202 is used, the display plug 203 of the detachable part 20 is plugged into the display interface 103 of the main part 10 to assemble the detachable part 20 to the main part 10, as shown in FIG. 4. In the present exemplary embodiment, the first display 101 and the second display 202 are touch screens and when the display plug 203 of the detachable part 20 is plugged into the display interface 103 of the main part 10, the first display 101 and the second display 202 act as one large integrated display.

In one exemplary embodiment, the display plug 203 and the keyboard plug 204 are arranged in a first sidewall 205 of the detachable part 20 in one traverse straight line. The keyboard interface 102 and the display interface 103 are arranged longitudinally in a first sidewall 105 of the main part 10. The first sidewall 105 of the main part 10 further includes a first pseudo-interface 106 and a second pseudo-interface 107. The first pseudo-interface 106 is horizontally aligned with the keyboard interface 102. Thus, when the second display is in use, the keyboard plug 204 is plugged into the first pseudo-interface 106. The second pseudo-interface 107 is horizontally aligned with the display interface 103. Thus, when the keyboard 20 is in use, the display plug 203 is plugged into the second pseudo-interface 107. The first pseudo-interface 106 and the second pseudo-interface 107 not only can receive unused interface, but also help secure the detachable part 20 to the main part 10.

In the present embodiment, as shown in FIG. 1, two sidewalls of the frame 104 each have a flange 108. Two second sidewalls of the detachable part 20 each have a sliding groove 206. The flanges 108 engage the sliding grooves 206 respectively to assemble the detachable part 20 to the main part 10. The distance between an inner surface 110 of the frame 104 and the flanges 108 of the main part 10 is greater than the distance between the sliding grooves 206 and either of the surface of the keyboard 201 and the surface of the second display 202.

Additionally, two slots 109 are respectively defined in the two sidewalls of the frame 104. Each slot 109 is covered by a tab 110. The tab 110 is connected to the frame on one side, and dangling out in the corresponding slot 109. Two hooks 207 respectively protrude from the two second sidewalls of the detachable part 20. When the detachable part 20 is assembled to the main part 10, the hooks 207 engage with the slots 109 to also fasten the detachable part 20 to the main part 10. The two hooks 207 are retractable. The two tabs 110 can be pressed to deform to force the two hooks to retract and disengage from the two slots 109 when a switch is needed.

Although the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A portable electronic apparatus, comprising a main part and a detachable part that is capable of being assembled to the main part;

the main part comprising a first display, a keyboard interface, and a display interface;

one face of the detachable part being a keyboard, and an opposite face of the detachable part being a second display, the detachable part further comprising a display plug and a keyboard plug, wherein:

when the keyboard plug of the detachable part is plugged into the keyboard interface of the main part, the keyboard is enabled to use; and when the display plug of the detachable part is plugged into the display interface of the main part, the second display is enabled to use.

2. The apparatus as described in claim 1, wherein the first display and the second display are touch screen.

3. The apparatus as described in claim 1, wherein the display plug and the keyboard plug are arranged in a first sidewall of the detachable part in one traverse straight line, the keyboard interface and the display interface are arranged longitudinally in a first sidewall of the main part, the first sidewall of the main part further comprises a first pseudo-interface and a second pseudo-interface, the first pseudo-interface is horizontally aligned with the keyboard interface and the second pseudo-interface is horizontally aligned with the display interface.

4. The apparatus as described in claim 1, further comprising a frame for receiving the detachable part.

5. The apparatus as described in claim 4, wherein two sidewalls of the frame each have a flange, two second sidewalls of the detachable part each have a sliding groove, the flanges engage the sliding grooves respectively to assemble the detachable part to the main part.

6. The apparatus as described in claim 5, wherein the distance between an inner surface of the frame and the flanges of the main part is greater than the distance between the sliding grooves and either of the surface of the keyboard and the surface of the second display.

7. The apparatus as described in claim 4, wherein two slots are respectively defined in two sidewalls of the frame, two hooks respectively protrude from the two second sidewalls of the detachable part, when the detachable part is assembled to the main part, the hooks engage with the slots to also fasten the detachable part to the main part.

8. The apparatus as described in claim 7, wherein each slot is covered by a dangling tab, and each hook is retractable; when the dangling tabs are pressed, the two hooks are driven to retract to disengage from the slots.

9. The apparatus as described in claim 1, wherein the first display and the second display act as one large integrated display when the second display is in use.

* * * * *